(12) United States Patent
Rajashekara et al.

(10) Patent No.: US 9,586,690 B2
(45) Date of Patent: Mar. 7, 2017

(54) HYBRID TURBO ELECTRIC AERO-PROPULSION SYSTEM CONTROL

(71) Applicant: ROLLS-ROYCE CORPORATION, Indianapolis, IN (US)

(72) Inventors: Kaushik Rajashekara, Murphy, TX (US); Christine A. H. Ross, Carmel, IN (US); Michael Armstrong, Avon, IN (US); Mark Blackwelder, Plainfield, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 230 days.

(21) Appl. No.: 14/127,409

(22) PCT Filed: Nov. 20, 2013

(86) PCT No.: PCT/US2013/070922
§ 371 (c)(1),
(2) Date: Dec. 18, 2013

(87) PCT Pub. No.: WO2014/158240
PCT Pub. Date: Oct. 2, 2014

(65) Prior Publication Data
US 2015/0367950 A1    Dec. 24, 2015

Related U.S. Application Data

(60) Provisional application No. 61/783,621, filed on Mar. 14, 2013.

(51) Int. Cl.
*B64D 31/00* (2006.01)
*B64D 31/06* (2006.01)
(Continued)

(52) U.S. Cl.
CPC ............ *B64D 31/06* (2013.01); *B64C 11/305* (2013.01); *B64D 27/10* (2013.01); *B64D 27/24* (2013.01);
(Continued)

(58) Field of Classification Search
None
See application file for complete search history.

(56) References Cited

U.S. PATENT DOCUMENTS 3,705,775 A    12/1972   Rioux
4,242,864 A    1/1981    Cornett et al.
(Continued)

FOREIGN PATENT DOCUMENTS

GB    2078861 A    1/1982
WO    2006069291    6/2006

OTHER PUBLICATIONS

International Search Report for PCT International Application Serial No. PCT/US2013/070922, completed Oct. 1, 2014, (11 pages).
(Continued)

*Primary Examiner* — Jonathan M Dager
(74) *Attorney, Agent, or Firm* — Barnes & Thornburg LLP (57) ABSTRACT

A control for a hybrid turbo electric aero-propulsion system prioritizes and optimizes the operating parameters, according to a desired optimization objective, for and across a number of different control optimization subsystems of the hybrid turbo electric aero-propulsion system. The control subsystems may include, for example, a propulsion control optimization subsystem and a power plant control optimization subsystem. The optimizations may be based on a
(Continued)

system model, which is developed and updated during the operation of the hybrid turbo electric aero-propulsion system.

12 Claims, 5 Drawing Sheets

(51) Int. Cl.

| | | |
|---|---|---|
| B64D 27/24 | (2006.01) | |
| F01D 7/02 | (2006.01) | |
| F01D 15/10 | (2006.01) | |
| F01D 21/00 | (2006.01) | |
| F02K 1/18 | (2006.01) | |
| F02C 7/32 | (2006.01) | |
| F02C 9/20 | (2006.01) | |
| B64C 11/30 | (2006.01) | |
| B64D 27/10 | (2006.01) | |
| B64D 27/02 | (2006.01) | |

(52) U.S. Cl.
CPC .............. *F01D 7/02* (2013.01); *F01D 15/10* (2013.01); *F01D 21/00* (2013.01); *F02C 7/32* (2013.01); *F02C 9/20* (2013.01); *F02K 1/18* (2013.01); *B64D 2027/026* (2013.01); *F05D 2270/20* (2013.01); *F05D 2270/304* (2013.01); *Y02T 50/64* (2013.01); *Y02T 50/677* (2013.01); *Y10S 903/93* (2013.01)

(56) References Cited

U.S. PATENT DOCUMENTS

| | | | |
|---|---|---|---|
| 4,258,545 A | 3/1981 | Slater | |
| 5,183,222 A | 2/1993 | Ramsey | |
| 5,823,468 A | 10/1998 | Bothe | |
| 7,410,122 B2 | 8/2008 | Robbins et al. | |
| 7,540,450 B2 | 6/2009 | Brand et al. | |
| 7,555,893 B2 | 7/2009 | Okai et al. | |
| 7,603,864 B2 | 10/2009 | Gemin et al. | |
| 7,735,774 B2 | 6/2010 | Lugg | |
| 7,952,244 B2 | 5/2011 | Colin | |
| 8,026,624 B2 | 9/2011 | Beutin et al. | |
| 8,099,944 B2 | 1/2012 | Foster et al. | |
| 8,109,073 B2 | 2/2012 | Foster et al. | |
| 9,174,741 B2* | 11/2015 | Suntharalingam | B64D 27/02 |
| 9,193,451 B2* | 11/2015 | Salyer | B64C 37/00 |
| 9,194,285 B2* | 11/2015 | Botti | B64D 27/24 |
| 2005/0196659 A1* | 9/2005 | Grieve | F02C 1/05 429/415 |
| 2007/0126292 A1 | 6/2007 | Lugg | |
| 2009/0097959 A1* | 4/2009 | Vos | F02C 9/44 415/1 |
| 2009/0145998 A1* | 6/2009 | Salyer | B64C 27/04 244/17.23 |
| 2010/0083632 A1* | 4/2010 | Foster | B64D 27/16 60/39.181 |
| 2010/0107651 A1* | 5/2010 | Hyde | F02C 6/00 60/784 |
| 2010/0107652 A1 | 5/2010 | Hyde et al. | |
| 2010/0126178 A1 | 5/2010 | Hyde et al. | |
| 2010/0219779 A1 | 9/2010 | Bradbrook | |
| 2010/0293951 A1 | 11/2010 | Fleming | |
| 2011/0100014 A1 | 5/2011 | Hyde et al. | |
| 2011/0138765 A1 | 6/2011 | Lugg | |
| 2011/0219741 A1 | 9/2011 | Ernst et al. | |
| 2012/0025676 A1 | 2/2012 | Poisson | |
| 2012/0119020 A1* | 5/2012 | Burns | B64D 27/00 244/58 |
| 2012/0128493 A1* | 5/2012 | Shelley | B64D 27/10 416/146 R |
| 2012/0167551 A1 | 7/2012 | Lugg | |
| 2012/0209456 A1* | 8/2012 | Harmon | B64C 39/024 701/3 |
| 2014/0339371 A1* | 11/2014 | Yates | B64D 39/00 244/53 R |
| 2015/0013306 A1* | 1/2015 | Shelley | F02K 5/00 60/224 |
| 2015/0151844 A1* | 6/2015 | Anton | B64C 31/024 244/55 |

OTHER PUBLICATIONS

U.S. Appl. No. 61/783,621, filed Mar. 14, 2013.
International Application No. PCT/US2013/070922, Nov. 20, 2013, 33 pages.

* cited by examiner

HYBRID TURBO ELECTRIC AERO-PROPULSION SYSTEM CONTROL

CROSS REFERENCE TO RELATED APPLICATIONS

This application is a U.S. national counterpart application of international application serial No. PCT/US2013/070922 filed Nov. 20, 2013, which claims priority to U.S. Provisional Patent Application No. 61/783,621 filed Mar. 14, 2013. The entire disclosures of PCT/US2013/070922 and U.S. Ser. No. 61/783,621 are hereby incorporated by reference.

FIELD OF THE DISCLOSURE

The present disclosure relates generally to turbine engines and more specifically to the control of hybrid turbo electric aero-propulsion systems.

BACKGROUND

Gas turbine engines can be used to power aircraft, watercraft, power generators, and the like. Gas turbine engines typically include a compressor, a combustor, and a turbine. A fan or propeller may be used to draw air into the engine. The compressor compresses the air and delivers higher-pressure air to the combustor. In the combustor, fuel is mixed with the higher-pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Where the turbomachinery is only intended to act as a genset, it may consist only of a turboshaft engine in which a motor is driven by an engine shaft. If the turbomachinery provides both propulsion and power, one or more generators may be mounted to an engine shaft.

Hybrid turbo electric propulsion systems may be used to power aircraft. In hybrid turbo electric aero-propulsion systems, a motor may be used in combination with a turbine engine to provide motive power to one or more fans or propellers. In distributed propulsion systems, the fans or propellers are placed at other locations around the aircraft, rather than being co-located with the engine. These distributed devices may be referred to as propulsors. The propulsors include a motor/generator which drives a fan. The fan may be used to provide forward thrust or reverse thrust (e.g., during landings). Additionally, the fan may be used to extract work from the airflow to provide electrical power. This may be useful, for example, during failure scenarios.

Thrust can be modulated by varying turbine speed, fan pitch, guide vane angles, nozzle/inlet areas, and/or other operating parameters.

SUMMARY

The present application discloses one or more of the features recited in the appended claims and/or the following features which, alone or in any combination, may comprise patentable subject matter.

According to at least one embodiment of this disclosure, a control for a turbo electric aero-propulsion system that includes a turbine engine, a generator to receive rotational energy from the turbine engine, an energy storage subsystem to receive electrical input from the generator, a motor to receive electrical input from the energy storage subsystem, and a fan that may be driven by either the engine or the motor, includes a propulsion control optimization subsystem to generate an optimal motor speed set point to control the motor and an optimal pitch angle set point to control the fan; a power plant control optimization subsystem to generate an optimal generator torque set point to control the generator and an optimal generator speed set point to control the engine; and an energy storage charge/discharge optimization subsystem to receive the optimal motor set point and the optimal pitch angle set point from the propulsion control optimization subsystem, receive the optimal generator torque set point and the optimal generator speed set point from the power plant control optimization subsystem, and generate an optimal energy storage current set point to control the amount of electrical current supplied by the energy storage subsystem to the motor. The energy storage subsystem may include a power converter, an energy storage device, and/or an inverter.

The subsystems may each be configured to optimize the efficiency of one or more components of the turbo electric aero-propulsion system. Embodiments of the energy storage charge/discharge optimization subsystem may be configured to optimize the efficiency of the turbo electric aero-propulsion system as a whole.

The set points may be computed by referencing a system model that estimates a controlled state of the turbo electric aero-propulsion system based on feedback control of the engine, the generator, the energy storage device, the motor, and the fan. The subsystems may reference a different local system model, where each of the different local system models is included in the system model. The subsystems may each send the respective optimal set point values to one or more feedback controllers to electronically control the respective mechanical or electro-mechanical device.

The propulsion control optimization subsystem may include a motor speed set point optimization subsystem to compute the optimal motor speed set point and a fan pitch angle set point optimization subsystem to, independently of the motor speed set point optimization subsystem, compute the optimal fan pitch angle set point. The motor speed set point optimization subsystem and the fan pitch angle set point optimization subsystem may optimize over different time intervals.

The power plant control optimization subsystem comprises a generator torque set point optimization subsystem to compute the optimal generator torque set point and an engine speed set point optimization subsystem to, independently of the generator torque set point optimization subsystem, compute the optimal generator speed set point. The generator torque set point optimization subsystem and the engine speed set point optimization subsystems may optimize over different time intervals.

According to at least one embodiment of this disclosure, a method for optimizing the efficiency of a turbo electric aero-propulsion system that includes a turbine engine, a generator to receive rotational energy from the turbine engine, an energy storage subsystem to receive electrical input from the generator, a motor to receive electrical input from the energy storage subsystem, and a fan that may be driven by either the engine or the motor, includes independently computing a plurality of optimal set points for the control of the engine, the generator, the motor, and the fan; and computing an optimal current set point for the control of the energy storage subsystem based on the optimal set points computed for the engine, the generator, the motor, and the fan and a system model derived from data relating to the current operating conditions of the components of the turbo electric aero-propulsion system.

According to at least one embodiment of this disclosure, a turbo electric aero-propulsion system includes a turbine engine; a generator to receive rotational energy from the turbine engine; an energy storage subsystem to receive electrical input from the generator; a motor to receive electrical input from the energy storage subsystem; a fan that may be driven by either the engine or the motor; and a control to optimize the efficiency of the turbo-electric aero-propulsion system by computing optimal set point values to electronically control the turbine engine, the generator, the energy storage subsystem, the motor and the fan. The energy storage subsystem may include a power converter, an inverter, and/or an energy storage device. The system may include a plurality of generators, wherein the control computes optimal set point values for each of the generators. The system may include a plurality of fans, wherein the control computes optimal set point values for each of the fans. The system may include a plurality of motors, wherein the control computes optimal set point values for each of the motors. The system may comprise a distributed propulsion system.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Figure 1:
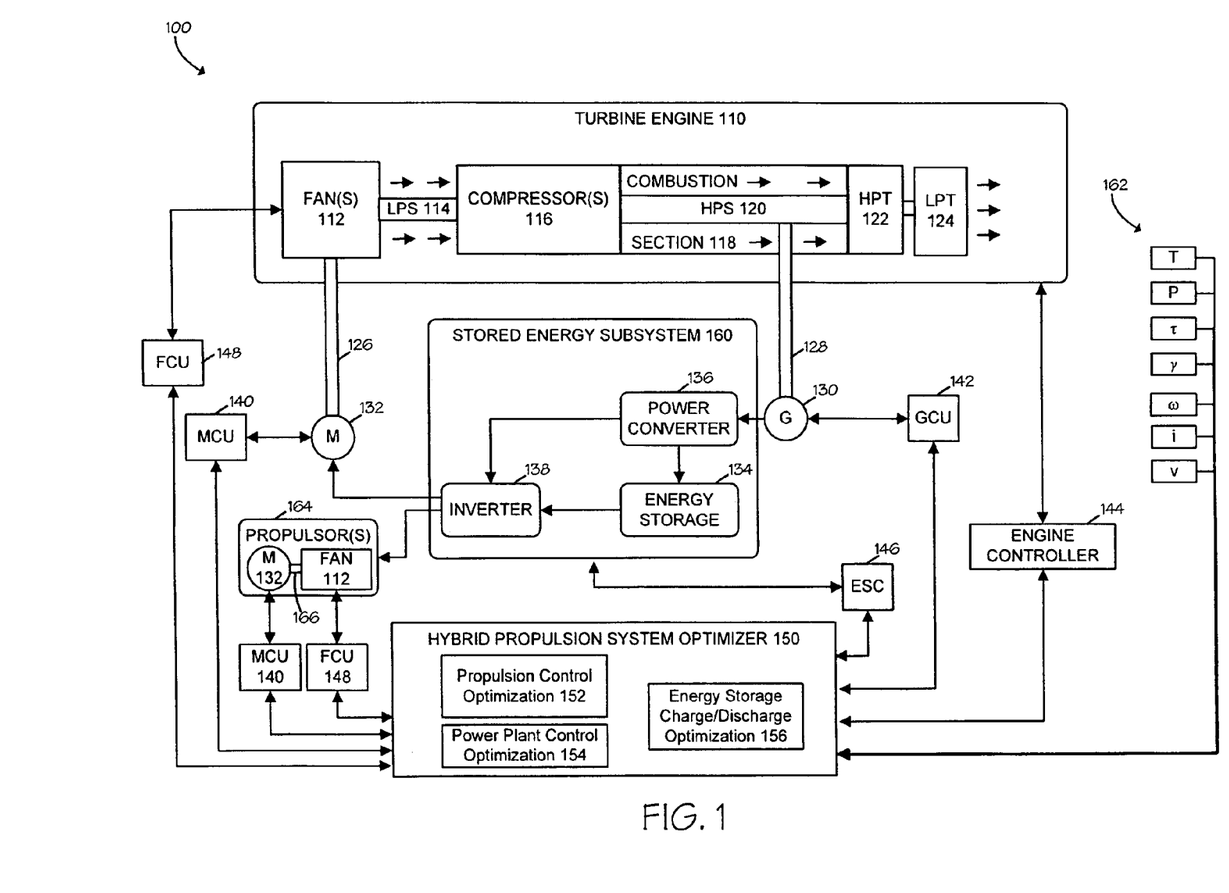
FIG. 1 is a simplified block diagram of at least one embodiment of a hybrid turbo electric propulsion system including a system-level optimizer.

Referring to FIG. 1, an embodiment of a hybrid turbo electric aero-propulsion system 100 includes a propulsion optimizer 150. The optimizer 150 is configured to optimize one or more optimization parameters (e.g., efficiency, performance, reliability, etc.) of the system 100 by optimizing certain subsystems of the system 100 independently, according to their respective time constants, and then coordinating the subsystem optimizations to provide optimal control of the entire system 100. As used herein, "optimize," "optimal," and similar terminology connotes an algorithmic process by which parameter values are computed and used to control the operation of the various components of the system 100 to achieve a desired objective, such as maximum efficiency. In this way, the optimizer 150 can enable the engine 110 to operate at a desired level of efficiency, under any operating conditions, in an aircraft or other vehicle powered by the system 100. For example, the optimizer 150 can integrate various control strategies of the engine 110 and the stored energy subsystem 160, to operate the engine 110 at a desired efficiency point for various load conditions. When used to optimize efficiency, the optimizer 150 can, for example, help improve the thrust specific fuel consumption (SFC) of the engine 110 and/or reduce the engine 110's overall emissions.

In some embodiments, all or portions of the optimizer 150 may be embodied as computerized programs, modules, routines, logic, or the like, in an engine controller 144 (which may be embodied as, for example, a Full Authority Digital Engine Controller or FADEC), one or more generator control units 142, one or more motor control units 140, one or more fan control units 148, one or more energy storage control units 146, or a combination of any of these. In other embodiments, the optimizer 150 may be embodied in a separate controller that interfaces with the control units 140, 142, 144, 146, 148 via one or more electronic communication links or networks. The optimizer 150 integrates real-time feedback control and on-line optimization to enable the system 100 to operate in accordance with one or more optimization objectives (expressed as, for example, optimization parameters). In some embodiments, the optimizer 150 is configured to maximize the fuel efficiency of the system 100.

The illustrative hybrid propulsion system 100 includes multiple sources of motive power, e.g., a turbine engine 110, one or more motors 132, and one or more propulsors 164. In various embodiments of the system 100, the engine 110 and/or the motor(s) 132 may be used to power one or more fans 112. For instance, the motor(s) 132 may be used to supply rotational power to the fan(s) 112 during periods of operation in which the motor(s) 132 can provide greater efficiency than the engine 110. As an example, the motor(s) 132 may be used during operating periods in which shorter-term or decreased levels of propulsive power are required, whereas the engine 110 may be favored during periods of operation in which a longer-term or more constant, sustained level of propulsive power is required. In embodiments where the system 100 includes a distributed propulsion system, one or more of the fans 112 may be mounted to the aircraft at other locations, apart from the engine 110. In other words, one or more of the fan(s) 112 may not be embodied within the engine 110, in some versions of the system 100. Such fans 112 may be driven, respectively, by additional motors 132. Fan-motor combinations that are not embodied within the engine 110 may be referred to as propulsors 164. Aspects of the operation of the engine 110, the fan(s) 112, and the motor(s) 132 are electronically-controlled, as described below.

Electrical energy is supplied to the motor(s) 132 by a stored energy subsystem 160. The illustrative stored energy subsystem 160 includes an energy storage device 134, a power converter 136, and an inverter 138. The illustrative system 100 includes one or more generators 130 that may, from time to time, receive rotational power from the turbine engine 110. The power converter 136 may convert voltage generated by the generator(s) 130 to electrical input (e.g., alternating current (AC) or direct current (DC), as may be required by a particular design of the system 100). The energy storage device 134 receives electrical input from the power converter 136 from time to time, and stores it for later use. The motor(s) 132 can receive electrical input from the inverter 138, which may be connected to the energy storage device 134 and/or the power converter 136, directly. In some embodiments, portions of the stored energy subsystem 160 may be distributed among other components of the system 100. For example, in some embodiments, the power converter 136 may be embodied in the generator control unit 142 and/or the inverter 138 may be embodied in the motor control unit 140.

The energy storage device 134 can store otherwise-unused electrical energy that is generated by the generator(s) 130 in response to rotational power received by the generator(s) 130 from the engine 110 (e.g., via a power take-off shaft 128). For example, the energy storage device 134 may be used to provide electrical power during transient loads and/or to store regenerative energy. The energy storage device 134 may be embodied as, for example, one or more superconducting energy storage devices, batteries, or battery packs.

The power converter 136 may be embodied as, for example, a converter that converts alternating electrical current (AC) to direct electrical current (DC) or a converter that converts DC to AC, as needed. As an example, a DC to AC converter can convert the battery voltage stored in the energy storage 134 to a level that is compatible with the DC voltage generated from the generator 130 after rectification.

The generator(s) 130 may each be embodied as, for example, a superconducting electric machine, a permanent magnet synchronous machine, or a wound field synchronous machine. The AC voltage of the generator may be converted to DC using, for example, a controlled rectifier or active rectifier. This DC output may be converted to variable frequency and variable voltage AC by the inverter 138, to control the speed and torque of the propulsor motors 132, in order to drive the fans 112, which provide the thrust. As should be appreciated by those skilled in the art, the inverter 138 may be embodied as electrical circuitry having a suitable topology, according to the requirements of a particular design of the system 100.

The operation of each of the engine 110, the fan(s) 112, the generator(s) 130, the motor(s) 132 and the energy subsystem 160 is electronically controlled by a corresponding controller, e.g., the control units 144, 148, 142, 140, 146, respectively. The control units 144, 148, 142, 140, 146 may each be embodied as electrical circuitry (e.g., as an integrated circuit or microprocessor-based system-on-a-chip), which sends electrical signals to the respective devices/systems 110, 112, 130, 132, 160 to adjust the operating parameters of the devices/systems 110, 112, 130, 132, 160 as needed during the operation of the system 100 (e.g., during different portions of the flight envelope, in the case of an aircraft). For example, each of the controllers 144, 148, 142, 140, 146 may electronically turn on or off a number of different electrical or electro-mechanical switches that are connected to the devices/systems 110, 112, 130, 132, 160, as needed to achieve a desired operating point, e.g., a desired amount of propulsive power, during a particular portion of the flight envelope. As described in more detail below, the illustrative optimizer 150 includes a propulsion control optimization subsystem 152, a power plant control optimization subsystem 154, and an energy storage charge/discharge optimization subsystem 156, which communicate optimal values of relevant operating parameters to the relevant devices/systems 110, 112, 130, 132, 160, based on desired optimization objective(s) and relevant current operating conditions of the system 100.

The illustrative turbine engine 110 is a multi-shaft turbofan gas turbine engine; however, aspects of the present disclosure are applicable to other types of turbine engines, including various types of turbofan, turboprop, and turboshaft systems. In the turbine engine 110, the fan(s) 112 (which may be embodied as, e.g., one or more fans, variable pitch propellers, etc.) may draw air into the engine 110, or, in the case of the propulsors 164, may be used to provide motive force. Referring specifically to the engine-mounted fans 112, some of the drawn-in air may bypass other engine components and thereby generate propulsion thrust. In the engine 110, the drawn-in air is forwarded to one or more compressors 116. The compressor(s) 116 increase the pressure of the air and forward the higher-pressure air to a combustion section 118. In the combustion section 118, the pressurized air is mixed with fuel, which is supplied to the combustion section 118 by a fuel supply such as a fuel injector (not shown). An igniter (not shown) is typically used to cause the mixture of air and fuel to combust. The high-energy combusted air is directed to one or more turbines 122, 124. In the illustrative embodiment, a high pressure turbine 122 is disposed in axial flow series with a low pressure turbine 124. The combusted air expands through the turbines 122, 124, causing them to rotate. The combusted air is then exhausted through, e.g., a propulsion nozzle (not shown), which may generate additional propulsion thrust.

The rotation of the turbines 122, 124 causes the engine shafts 114, 120, to rotate. In the illustrative embodiments, rotation of the low pressure turbine 124 drives a low pressure shaft 114, which can drive an engine-mounted fan 112. In some embodiments, the low pressure shaft 114 may drive an electrical machine, such as a generator, which may, for example, provide electrical power to the aircraft's electrical system. Rotation of the high pressure turbine drives a high pressure shaft 120, which drives the compressor(s) 116. In some embodiments, the shafts 114, 120 may be concentrically disposed. The high pressure turbine 122 drives a power take-off assembly 128 via the high pressure shaft 120, which, in the illustrated embodiment, drives a generator 130. The generator(s) 130 may generate electrical power that is supplied to other components or systems of the aircraft or other vehicle to which it is coupled. The motor 132 receives electrical energy from the stored energy subsystem 160, and converts the received electrical energy into rotational power, which can then be supplied to the fan(s) 112 via a motor shaft 126.

The engine controller 144 may control the overall operation of the engine 110. For example, the engine controller 144 may control the rate of fuel flow to the combustion section 118, as well as the airflow through the engine 110 (e.g., by varying the pitch angle of vanes of the fan(s) 112). As such, all or portions of the controllers 140, 142, 146, 148 may be embodied in the engine controller 144.

In general, the engine controller 144 and/or the controllers 140, 142, 146, 148 receive electrical signals from a number of different sensors 162, which are installed at various locations on the engine 110 and/or other mechanical components of the system 100, to sense various physical parameters, such as temperature (T), air pressure (P), torque ($\tau$), pitch angle ($\gamma$), rotational speed ($\omega$), electrical current (i), and voltage (v), which represent various aspects of the current operating condition of the system 100. The sensors 162 may supply electrical signals representing the instantaneous values of the sensed information to the optimizer 150, either directly or indirectly via the engine controller 144 or the controllers 140, 142, 146, 148, as needed. In response to the sensor signals, the optimizer 150 supplies various commands to the engine controller 144 and/or the controllers 140, 142, 146, 148, as needed to control various aspects of the operation of the system 100 in accordance with the desired optimization objective(s).

The generator control unit 142 controls the operation of the generator(s) 130. That is, the generator control unit 142 adjusts the operating parameters of the generator(s) 130 to vary the amount of rotational energy that the generator(s) 130 draw from the shaft 128. For instance, the generator control unit 142 may configure the generator(s) 130 to either generate electrical energy or not generate electrical energy, or to generate a certain amount of electrical energy for storage in the energy storage 134, based on current operating conditions and/or other parameters. As noted above, the power converter 136 may be contained in the generator control unit 142 in some embodiments, in order to convert electrical energy into a form that can either be stored by the energy storage 134 or used by the motor(s) 132.

The motor control units 140 control the operation of the motors 132 to convert electrical energy supplied to the motors 132 by the stored energy subsystem 160 to rotational power, which the motors 132 supply to the fans 112 via respective motor shafts (e.g., the shafts 126, 166). For instance, a motor control unit 140 may turn a motor 132 on or off, or change the motor speed, during specific portions of the flight envelope, based on current operating conditions and/or other parameters. As noted above, the inverter 138 may be contained in the motor control unit 140 in some embodiments, in order to convert electrical input received from either the power converter 136 or the energy storage 134 into a form that can be used by the motor 132.

The energy storage control unit 146 controls the operation of the stored energy subsystem 160, to control the operation of the power converter 136, the charging of the energy storage 134, and the discharge of electrical energy to the motors 132 (e.g., via the inverter 138, the power converter 136, and/or the energy storage 134). For example, the energy storage control unit 146 may turn the charging of the energy storage 134 on or off, or turn the discharging of electrical energy by the power converter 136 or the energy storage 134 on or off, during specific portions of the flight envelope, based on current operating conditions and/or other parameters. Adjustments in the amount of electrical energy supplied by the generator(s) 130, the stored energy subsystem 160, and the motor(s) 132 may vary based on the amount of electrical energy demanded by the system 100 and/or the desired amount of propulsive power as determined by, for example, current operating conditions, performance or fuel efficiency considerations.

The fan control unit 148 controls the operation of the fan(s) 112, by varying the amount of pitch angle of the fan blades, for example, to achieve a desired propulsive effect. For example, the fan control unit 148 may increase or decrease the pitch angle of one or more of the fan(s) 112, during specific portions of the flight envelope, based on current operating conditions and/or other parameters.

Figure 2:
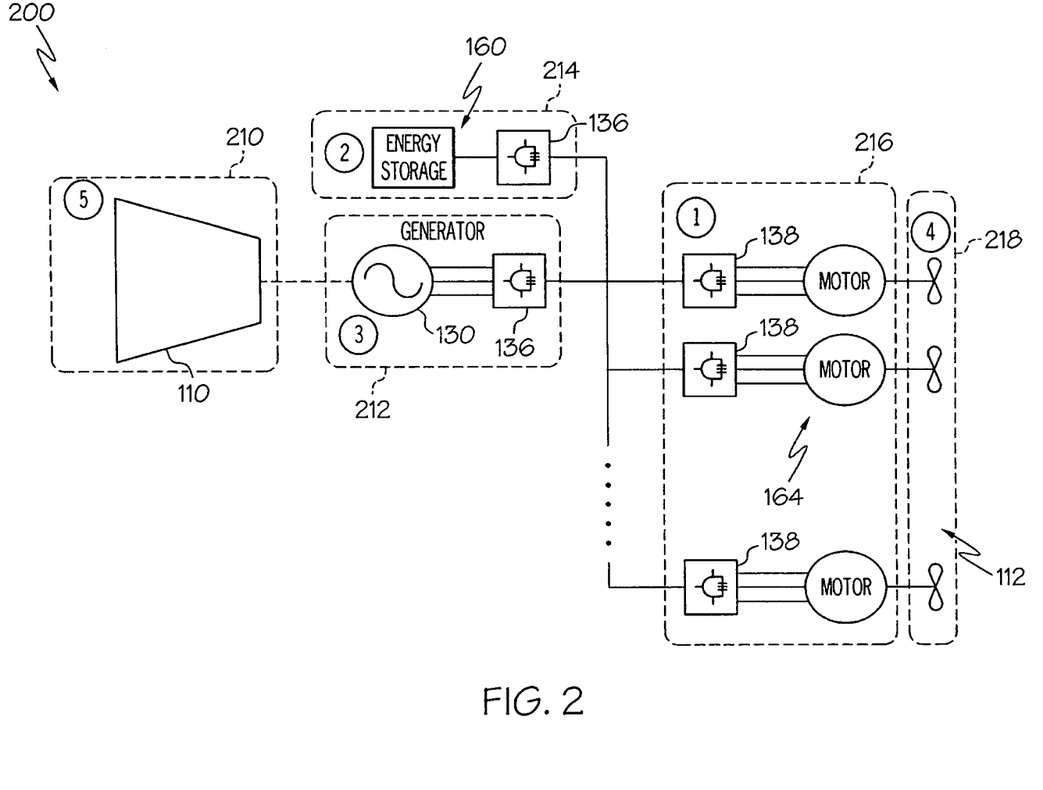
FIG. 2 is a simplified block diagram of at least one embodiment of a system architecture for an embodiment of the system of FIG. 1.

Referring now to FIG. 2, an embodiment 200 of a system architecture for power conversion aspects of a distributed version of the system 100, in which the fans 112 are not embodied with the engine 110, is shown. The embodiment 200 includes an engine control subsystem 210, a generator control subsystem 212, an energy storage control subsystem 214, a motor control subsystem 216, and a fan control subsystem 218. The engine subsystem 210 transfers rotational power to the generator subsystem 212. The generator subsystem 212 converts the rotational power to electrical power. The generator subsystem 212 may transfer some of the electrical power to the energy storage subsystem 214 and may transfer some of the electrical power to the motor subsystem 216. The motor subsystem 216 converts the electrical power back to rotational power and transfers rotational power to the fan control subsystem 218. In the illustrated embodiment, the motor subsystem 216 includes multiple motors 132, each of which drives a different fan 112. As shown in FIG. 2, the subsystems 210, 212, 214, 216, 218 may each be embodied as a combination of mechanical or electro-mechanical devices or systems and electrical control circuitry. For example, aspects of the controllers 140, 142, 146, 148 described above may be embodied in the subsystems 210, 212, 214, 216, 218. With the optimizer 150, optimization and control can be achieved at a local level (e.g., at the subsystems 210, 212, 214, 216, 218) and also at a global, system-wide level (e.g., at the level of the system 100 as a whole).

In an aircraft, the required thrust for propulsion can be provided by a jet engine 110 driving a fan 112 (e.g., as in a turbofan based system) or a variable pitch propeller or fan 112 (e.g., as in a turboshaft system). As shown in FIG. 2, instead of driving the fans 112 from the engine 110, the fans 112 can be located on the aircraft apart from the engine 110 and driven by the electric motors 132. The electric power required for driving the electric motors 132 is obtained from a generator 130 driven by the jet engine 110. Electric motors are typically highly efficient and their efficiency is generally more than 90%. Jet engines typically are not as efficient as electric motors. The efficiency of the jet engine varies with, for example, the speed and the load seen by the engine. The jet engines will have a highest efficiency at a particular operating point and speed.

In FIG. 2, the engine 110 drives the generator 130, and the generator output voltage is converted to variable frequency and variable voltage AC, which is used to drive the electric motors 132, which drive the fans 112, which provide propulsive thrust for the aircraft. In some embodiments, the same generator 130 can provide power to the multiple motors 132, to drive multiple propellers or fans 112, so that the thrust produced is distributed. In other embodiments, multiple generators 130 may each drive a respective motor 132.

To enable the engine 110 to operate at a maximum efficiency operating point, the optimizer 150 combines the following parameters of the engine, generator, energy storage, motor, and fan control subsystems 210, 212, 214, 216, 218: transient power transferred to the motors 132 from the energy storage unit 134 and/or the power converter 136; stored electrical energy, from the generator 130 and stored in the energy storage unit 134 during the operating region where excess energy is available from the engine 110; pitch angle control, for control of the propeller or fan; and engine cycle, for control of the operation of the engine 110.

The optimizer 150 can combine all of these parameters into an overall or global control system to operate the engine 110 at a desired efficiency level (e.g., a maximum efficiency) under all operating conditions. As the number of control effectors governing overall system efficiency is larger for distributed propulsion systems than for conventional aircraft propulsion systems, the optimizer 150 can integrate multiple control effectors pursuant to the desired optimization objective (e.g., maximum efficiency). Depending on the operating region of the aircraft, the optimizer 150 can manipulate one or more or all of the control aspects to obtain the desired efficiency of the overall propulsion system 100. In addition, the optimizer 150 can manipulate the control parameters of the generator 130 to obtain the required electrical inputs for the thrust-providing motors 132. Further, the optimizer 150 can prioritize the control effectors of a distributed propulsion system to provide an optimal control strategy for the entire system 100. In this way, the optimizer 150 can enable operation of the engine 110, propulsor motors 132, and the rest of the system 100 under desired efficiency operating points to, for example, reduce the amount of fuel consumed by the engine and thus improve the system's overall SFC.

Figure 3:
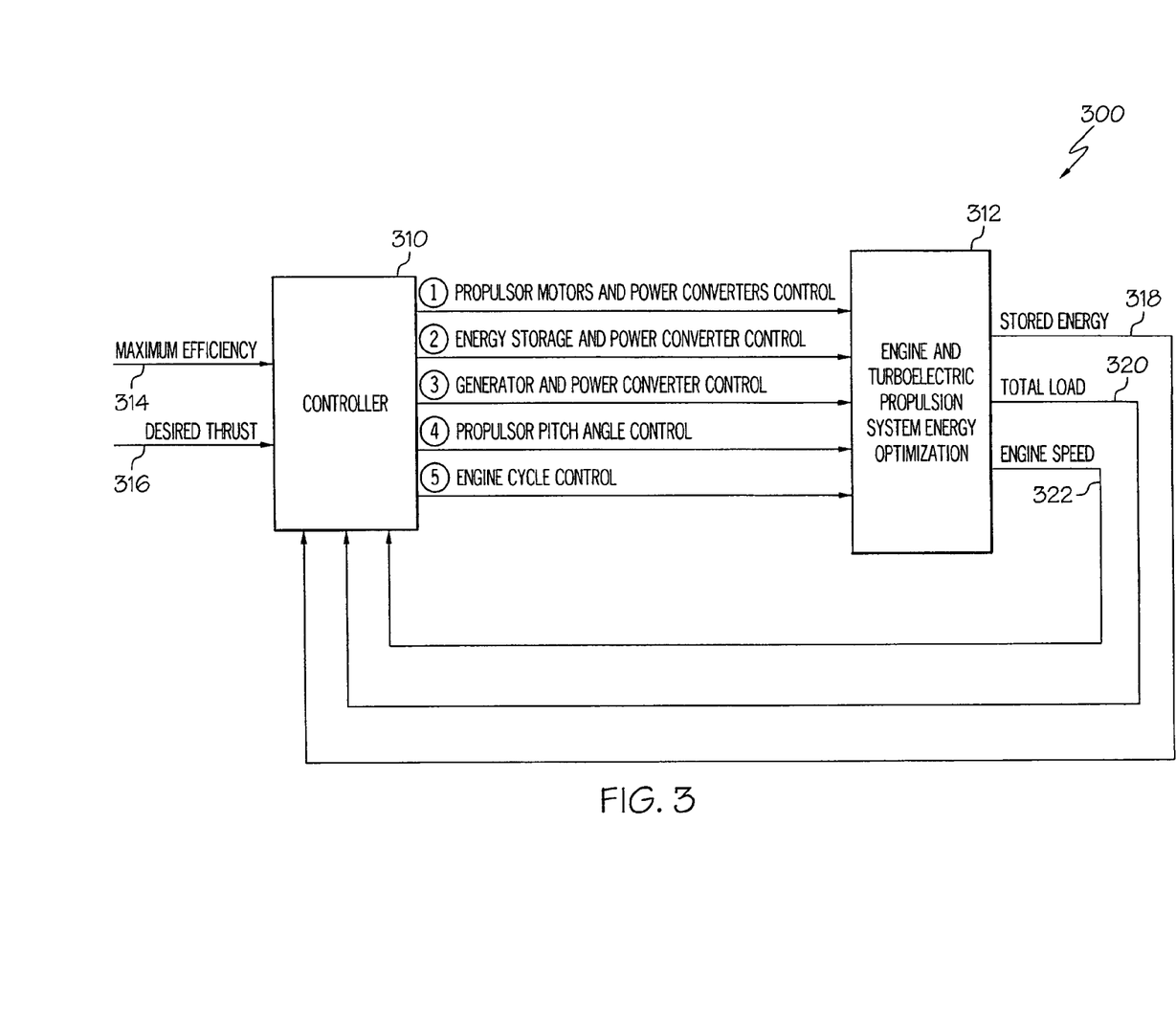
FIG. 3 is a simplified flow diagram of at least one embodiment of an optimal control method for the system of FIG. 1.

Referring to FIG. 3, an embodiment 300 of the optimizer 150 is shown. A desired optimization objective is embodied as a maximum efficiency parameter 314 (e.g., the objective of the optimization is to maximize the fuel efficiency of the system 100). A desired thrust 316 represents the currently desired thrust, as determined from, e.g., sensor input or another control algorithm, during operation of the system 100. A controller 310 applies the inputs 314, 316 and the feedback values 318, 320, 322 to the control algorithms for the subsystems 210, 212, 214, 216, 218 illustrated in FIG. 2, and supplies the above-described parameters, which are obtained from the control subsystems 210, 212, 214, 216, 218, to an energy optimization algorithm 312. In the example of FIG. 3, the algorithm 312 computes optimal values for stored energy 318, total load 320, and engine speed 322, based on the maximum efficiency 314 and the desired thrust 316, using, for example, a nonlinear optimal control method. In some embodiments, the energy optimization algorithm 312 prioritizes the optimization of the subsystems 210, 212, 214, 216, 218, as indicated by the circled numerical values shown in FIGS. 2 and 3. That is, based on time constants, response times, and/or other constraints associated with the various subsystems 210, 212, 214, 216, 218, the algorithm 312 may begin optimizing one of the subsystems 210, 212, 214, 216, 218 before the others. For instance, in the embodiment 300, the optimizations for the subsystems 214 (power converters) and 216 (propulsor motors) may be initiated before the others, while optimizations for the subsystem 210 (engine) may be initiated later. Further, in the embodiment of FIG. 3, aspects of the power converter optimization may be performed contemporaneously with motor and generator optimizations. As such, the power converter optimization can impact or be impacted by the motor and generator optimizations, and vice versa. The values 318, 320, 322 are fed back to the controller 310 and applied to the control subsystems 210, 212, 214, 216, 218.

Figure 4:
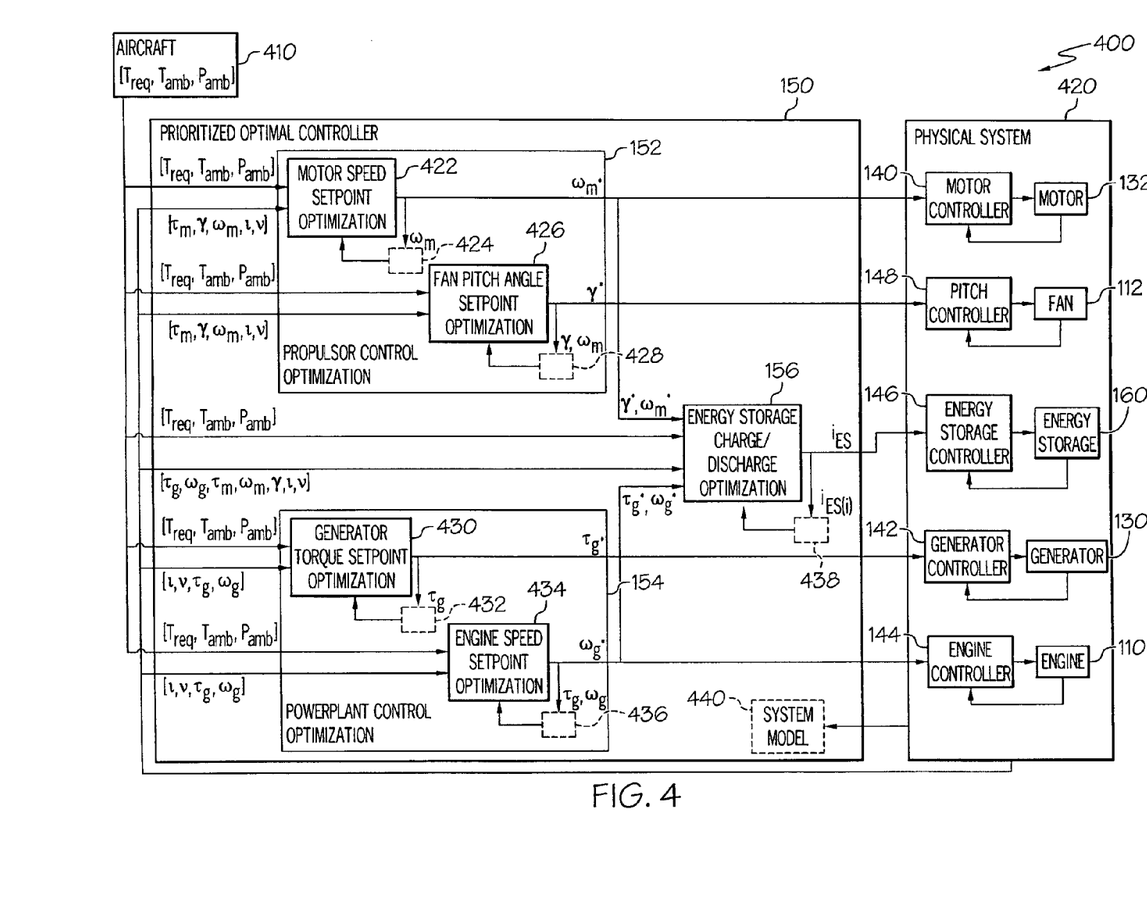
FIG. 4 is a simplified flow diagram of at least one embodiment of an optimal control method for the system of FIG. 1.

Referring now to FIG. 4, an embodiment 400 of the optimizer 150 is shown in the broader context of an entire physical system, which includes other aspects of an aircraft 410 and the feedback control subsystems 420, described above. The illustrative embodiment 400 is configured to optimize the system 100 for efficiency. In order to maintain the engine speed at a certain value to achieve the optimum efficiency, the power delivered by the engine 110 needs to be maintained in a certain (typically narrow) range. According to the embodiment 400, the optimizer 150 is composed of five optimization subsystems: a motor speed set point ($\omega_m^*$) subsystem 422, a fan pitch angle set point ($\gamma^*$) subsystem 426, a generator torque set point ($\tau_g^*$) subsystem 430, an engine speed set point ($\omega_g^*$) subsystem 434, and an energy storage charge/discharge ($i_{ES}^*$) subsystem 156. The asterisk (*) denotes that the variable is a set point and not the measured or model-estimated state. Other control variables not depicted in the diagrams may include, for example, inlet nozzle area commands and/or variable guide vane set points.

In the illustrated embodiment, the subsystems 422, 426, 430, 434, 156 are arranged and coordinated according to the relationships between the electrical and mechanical power sources. For instance, the propulsion ("load") control optimization subsystem 152 coordinates the optimizations of the motor speed set point optimization subsystem 422 and the fan pitch angle set point optimization subsystem 426 and sends both the optimal pitch angle set point and the optimal motor speed set point to the energy storage charge/discharge optimization subsystem 156. Similarly, the power plant ("power") optimization subsystem 154 coordinates the optimizations of the generator torque set point optimization subsystem 430 and the engine speed set point optimization subsystem 434 and sends both the optimal generator torque set point and the optimal generator speed set point to the energy storage charge/discharge optimization subsystem 156.

The inputs to the optimization subsystems as depicted in FIG. 4 are the aircraft-required temperature ($T_{req}$), the ambient temperature ($T_{amb}$), the ambient air pressure ($P_{amb}$), the motor torque ($\tau_m$), the motor speed ($\omega_m$), the generator torque ($\tau_g$), the generator speed ($\omega_g$), the fan pitch angle ($\gamma$), the electrical current (i), and the voltage (v). These inputs may be obtained from, e.g., the sensors 162, the engine controller 144, and/or other components of the aircraft 410. In addition to these measured inputs, the controlled states are estimated by a system model 440 or portions thereof, and fed back into each set point optimization subsystem 422, 426, 430, 434, 156 (where a "state" refers to one or a combination of actual or estimated operating conditions of the system 100 at a given point in time, which are controlled by the control algorithms of the system 100). The controlled states are estimated at discrete times, denoted by the superscript (i).

The optimization subsystems 422, 426, 430, 434, 156 use these inputs, as well as their respective local model 424, 428, 432, 436, 438, to determine the optimum value for each set point, to optimize the engine 110 and system 100 for efficiency. Each of the local models 424, 428, 432, 436, 438 includes all or a portion of the system model 440. For instance, a particular local model 424, 428, 432, 436, 438 may only include values and logic that would affect the optimization of the particular parameter(s) of its respective subsystem 422, 426, 430, 434, 156. In general, the term, "model" refers to a mathematical model; that is, mathematical equations or algorithms and parameters that can be used to create a mathematical or estimated representation of the various controlled aspects of the system 100. Some examples of numerical algorithms that may be used by the optimizer include any suitable nonlinear optimization model. For instance, a gradient-based method such as an augmented LaGrangian method may be used in some embodiments. Each of the subsystems 422, 426, 430, 434, 156 may use the same or different models or techniques, in various embodiments of the system 100.

Each of the set points is fed into a corresponding controller. For example, the motor speed set point optimization subsystem 422 applies the local model 424 and the current values of the required temperature, ambient temperature, ambient pressure, motor torque, pitch angle, motor speed, current, and voltage inputs to the independent variable, motor speed, and, based thereon, outputs an optimal set point value for the motor speed to the motor controller 140. The motor controller 140 then adjusts the operating parameters of the motor 132 to achieve the optimal set point value for motor speed. Similarly, the fan pitch angle set point optimization subsystem 426 applies the local model 428 and the current values of the required temperature, ambient temperature, ambient pressure, motor torque, pitch angle, motor speed, current, and voltage inputs to the independent variables, pitch angle and motor speed, and, based thereon, outputs an optimal set point value for the fan pitch angle to the fan/pitch controller 148. The fan controller 148 then adjusts the operating parameters of the fan 112 to achieve the optimal set point value for the pitch angle.

Likewise, the generator torque set point optimization subsystem 430 applies the local model 432 and the current values of the required temperature, ambient temperature, ambient pressure, current, voltage, generator torque and generator speed inputs to the independent variable, generator torque, and, based thereon, outputs an optimal set point value for the generator torque to the generator controller 142. The generator controller 142 then adjusts the operating parameters of the generator 130 to achieve the optimal set point value for the generator torque. Similarly, the engine speed set point optimization subsystem 434 applies the local model 436 and the current values of the required temperature, ambient temperature, ambient pressure, current, voltage, generator torque and generator speed inputs to the independent variables, generator torque and generator speed, and, based thereon, outputs an optimal set point value for the generator speed to the engine controller 144. The engine controller 144 then adjusts the operating parameters of the engine 110 to achieve the optimal set point value for the generator speed.

Additionally, the energy storage charge/discharge optimization subsystem 156 applies the local model 438 and the current values of the required temperature, ambient temperature, ambient pressure, generator torque, generator speed, motor torque, motor speed, pitch angle, current, and voltage inputs, and the current optimal set point values for pitch angle, motor speed, generator torque, and generator speed, to the independent variable, current (supplied by energy storage), and, based thereon, outputs an optimal set point value for the energy storage current to the energy storage controller 146. The energy storage controller 146 then adjusts the operating parameters of the stored energy subsystem 160 (including the power converter 136) to achieve the optimal set point value for the energy storage current. In this way, the energy storage charge/discharge optimization subsystem 156 integrates and coordinates the optimizations performed by the other subsystems 422, 426, 430, 434. As such, the optimizer 150 can optimize the efficiency of the local subsystems 422, 426, 430, 434 and also optimize the entire system 100, through the energy storage charge/discharge optimization subsystem 156 and the stored energy subsystem 160.

The respective controlled physical systems 132, 112, 134, 130, 110 feed back appropriate measured states to the respective physical system controllers 140, 148, 146, 142, 144. This allows the optimizer 150 to determine the accuracy of the measured state to the set point. The measured states are also incorporated into the system model 440 and the local system models 424, 428, 432, 436, 438 (e.g., as degradation parameters).

The set points, model-estimated states, and measured states are set, calculated, or measured at varying intervals of time during the operation of the system 100. The interval of time is determined by the physical subsystem time constant. That is, the optimizations of the different subsystems 422, 426, 430, 434, 156 may each be executed at or according to different time intervals. For example, the electrical subsystems 156, 422, 430 (energy storage, motor, and generator) typically have shorter time constants than the mechanical subsystems 426, 434 (engine and fan). As a result, the set points, model-estimated states, and measured states for the electrical subsystems 156, 422, 430 are typically updated more frequently than those for the mechanical subsystems 426, 434. Thus, in some embodiments, the execution of certain of the subsystems 422, 426, 430, 434, 156 may be prioritized according to the applicable time constants or time intervals.

As an example hypothetical, suppose the optimization objective is efficient propulsion. Suppose further that together, motor efficiency and propulsor (e.g., fan) efficiency provide optimal thrust. Further, suppose that motor efficiency is as function of the motor speed, and the propulsor efficiency is a function of the pitch angle and the motor speed. Given the current operating inputs, the optimizer 150 determines a combination of pitch angle set point and motor speed set point to provide optimal efficiency and thrust. However, suppose that the time it takes to change the pitch angle is longer than the time it takes to vary the motor speed. Since the pitch angle and motor speed change at different rates, the pitch angle and speed optimizations will occur at different rates. Accordingly, the illustrative optimizer 150 is designed to perform the pitch angle and motor speed optimizations independently, but then coordinate them through the energy storage optimization.

To illustrate further, if motor speed changes quickly and pitch angle changes more slowly, then the optimizer 150 can first perform an optimization in which the pitch angle is assumed to be fixed and the speed is assumed to be variable (to optimize the motor speed assuming the pitch angle cannot be changed). Since the motor speed changes faster than pitch angle, the optimal motor speed set point will be reached more quickly. At the same time, the optimizer 150 can perform an optimization in which the pitch angle is optimized assuming a constant speed (e.g., the optimal speed set point, if available). In this case, the pitch angle will be optimized, but at a slower rate than the motor speed, and eventually, the two optimizations will converge.

Figure 5:
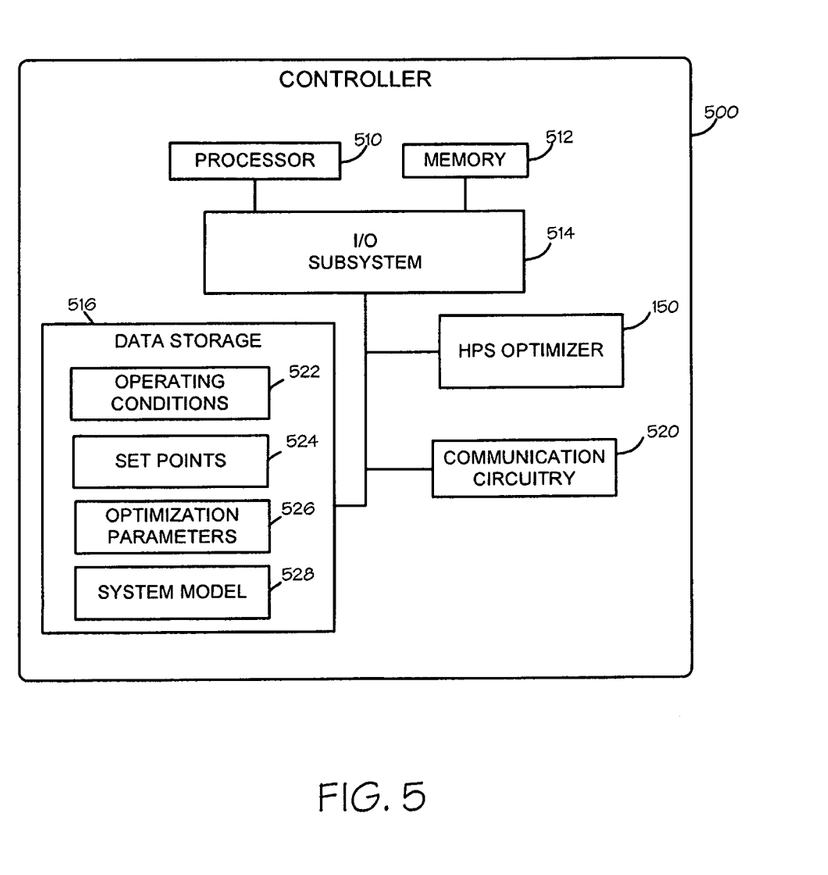
FIG. 5 is a simplified block diagram of at least one embodiment of a controller for a hybrid turbo electric propulsion system.

Referring now to FIG. 5, a simplified block diagram of an exemplary controller 500, in which the optimizer 150 may be embodied, is shown. The controller 500 includes at least one processor 510 (e.g. a microprocessor, microcontroller, digital signal processor, etc.), memory 512, and an input/output (I/O) subsystem 514. The controller 500 and/or portions thereof may be embodied in a control unit of the engine 110, for example. The I/O subsystem 514 typically includes, among other things, an I/O controller, a memory controller, and one or more I/O ports. The processor 510 and the I/O subsystem 514 are communicatively coupled to the memory 512. The memory 512 may be embodied as any type of suitable computer memory device (e.g., volatile memory such as various forms of random access memory).

The I/O subsystem 514 is communicatively coupled to one or more storage media 516, the optimizer 150, and communication circuitry 520. The storage media 516 may include any suitable data storage device (e.g., flash memory, memory cards, etc.). The storage media 516 may store data relating to system operating conditions 522, set points 524, optimization parameters 526, and/or system models 528. The communication circuitry 520 may include any suitable electronic communications link, bus, or network and may be configured to communicate control signals from the optimizer 150 to, for example, the controllers 140, 142, 144, 146, 148, and/or to communicate operating parameters from the engine 110, other components of the system 100, and/or sensors 162, to the optimizer 150. The controller 500 may include other components, sub-components, and devices not illustrated in FIG. 5 for clarity of the description. In general, the components of the controller 500 are communicatively coupled as shown in FIG. 5 by electronic signal paths, which may be embodied as any type of wired or wireless signal paths capable of facilitating communication between the respective devices and components.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

What is claimed is:

1. A control system for a turbo electric aero-propulsion system comprising a turbine engine, a generator to receive rotational energy from the turbine engine, an energy storage subsystem to receive electrical input from the generator, the energy storage subsystem comprising one or more of: an energy storage device, a power converter, and an inverter, a motor to receive electrical input from the energy storage subsystem, and a fan that may be driven by either the engine or the motor, the control system having one or more processors comprising:

a propulsion control optimization subsystem that generates an optimal motor speed set point and sends the set point to a motor controller to control the motor speed and generates an optimal pitch angle set point and sends the set point to a fan controller to control the fan;

a power plant control optimization subsystem that generates an optimal generator torque set point and sends the set point to a generator controller that controls the generator and an optimal generator speed set point to control the engine;

an energy storage charge/discharge optimization subsystem that receives the optimal motor set point and the optimal pitch angle from the propulsion control optimization subsystem, receives the optimal generator torque set point and the optimal generator speed set point from the power plant control optimization subsystem, and generates an optimal energy storage current set point and sends the set point to the energy storage controller to control the amount of electrical current supplied by the energy storage subsystem to the motor, wherein the propulsion control optimization subsystem comprises a motor speed set point optimization subsystem to compute the optimal motor speed set point and a fan pitch angle set point optimization subsystem to, independently of the motor speed set point optimization subsystem, compute the optimal fan pitch angle set point, and wherein the motor speed set point optimization subsystem and the fan pitch angle set point optimization subsystems optimize over different time intervals.

2. A control system for a turbo electric aero-propulsion system comprising a turbine engine, a generator to receive rotational energy from the turbine engine, an energy storage subsystem to receive electrical input from the generator, the energy storage subsystem comprising one or more of: an energy storage device, a power converter, and an inverter, a motor to receive electrical input from the energy storage subsystem, and a fan that may be driven by either the engine or the motor, the control system having one or more processors comprising:

a propulsion control optimization subsystem that generates an optimal motor speed set point and sends the set point to a motor controller to control the motor speed and generates an optimal pitch angle set point and sends the set point to a fan controller to control the fan;

a power plant control optimization subsystem that generates an optimal generator torque set point and sends the set point to a generator controller that controls the generator and an optimal generator speed set point to control the engine;

an energy storage charge/discharge optimization subsystem that receives the optimal motor set point and the optimal pitch angle from the propulsion control optimization subsystem, receives the optimal generator torque set point and the optimal generator speed set point from the power plant control optimization subsystem, and generates an optimal energy storage current set point and sends the set point to the energy storage controller to control the amount of electrical current supplied by the energy storage subsystem to the motor, wherein the power plant control optimization subsystem comprises a generator torque set point optimization subsystem to compute the optimal generator torque set point and an engine speed set point optimization subsystem to, independently of the generator torque set point optimization subsystem, compute the optimal generator speed set point, and wherein the generator torque set point optimization subsystem and the engine speed set point optimization subsystems optimize over different time intervals.

3. A method for optimizing the efficiency of a turbo electric aero-propulsion system comprising a turbine engine, a generator to receive rotational energy from the turbine engine, an energy storage subsystem to receive electrical input from the generator, the energy storage subsystem comprising one or more of: an energy storage device, a power converter, and an inverter, a motor to receive electrical input from the energy storage subsystem, and a fan that may be driven by either the engine or the motor, the method comprising:

independently computing a plurality of optimal set points for the control of the engine, the generator, the motor, and the fan; and computing an optimal current set point and controlling of the energy storage subsystem based on the optimal set points computed for the engine, the generator, the motor, and the fan, and a system model derived from data relating to the current operating conditions of the components of the turbo electric aero-propulsion system; and outputting the optimal set points to one or more feedback controllers electronically controlling the turbo electric aero-propulsion system, wherein the method is performed by one or more processors.

4. The method of claim 3, comprising computing an optimal motor speed set point and, independently of the computing of the optimal motor speed set point, computing an optimal fan pitch angle set point.

5. The method of claim 4, comprising computing the optimal motor speed set point and the optimal fan pitch angle set point over different time intervals.

6. The method of claim 3, comprising computing an optimal generator torque set point and, independently of the computing of the optimal generator torque set point, computing the optimal generator speed set point.

7. The method of claim 6, comprising computing the optimal generator torque set point and the optimal generator speed set point over different time intervals.

8. A hybrid turbo electric aero-propulsion system comprising:
a turbine engine;
a generator to receive rotational energy from the turbine engine;
an energy storage subsystem to receive electrical input from the generator, the energy storage subsystem comprising one or more of: an energy storage device, a power converter, and an inverter;
a motor to receive electrical input from the energy storage subsystem;
a fan that may be driven by either the engine or the motor; and
a control to optimize the efficiency of the turbo-electric aero-propulsion system by computing optimal set point values for each of the turbine engine, the generator, the energy storage subsystem, the motor, and the fan to electronically control the turbine engine, the generator, the energy storage subsystem, the motor and the fan.

9. The system of claim 8, comprising a plurality of generators, wherein the control computes optimal set point values for each of the generators.

10. The system of claim 8, comprising a plurality of fans, wherein the control computes optimal set point values for each of the fans.

11. The system of claim 8, comprising a plurality of motors, wherein the control computes optimal set point values for each of the motors.

12. The system of claim 8, wherein the hybrid turbo electric aero-propulsion system comprises a distributed propulsion system.

* * * * *